(12) United States Patent
Huang

(10) Patent No.: US 7,570,253 B2
(45) Date of Patent: Aug. 4, 2009

(54) PEN-TYPE COMPUTER

(75) Inventor: Yen-Son Paul Huang, Cupertino, CA (US)

(73) Assignee: Fortemedia, Inc., Cupertino, CA (US)

( * ) Notice: Subject to any disclaimer, the term of this patent is extended or adjusted under 35 U.S.C. 154(b) by 455 days.

(21) Appl. No.: 11/469,927

(22) Filed: Sep. 5, 2006

(65) Prior Publication Data

US 2007/0205996 A1  Sep. 6, 2007

Related U.S. Application Data

(60) Provisional application No. 60/779,583, filed on Mar. 6, 2006.

(51) Int. Cl.
*G06F 3/033* (2006.01)

(52) U.S. Cl. .............. 345/179; 178/19.01; 178/19.03; 178/19.04; 178/19.07

(58) Field of Classification Search ......... 345/173–184; 178/18.01–18.07, 19.01–19.06
See application file for complete search history.

(56) References Cited

U.S. PATENT DOCUMENTS

| 5,850,058 | A | * | 12/1998 | Tano et al. | ............... 178/18.01 |
| 6,633,282 | B1 | * | 10/2003 | Monroe | ...................... 345/179 |
| 2004/0113896 | A1 | * | 6/2004 | Monroe | ...................... 345/179 |
| 2007/0005849 | A1 | * | 1/2007 | Oliver | .......................... 710/72 |

OTHER PUBLICATIONS

International Search Report and Written Opinion, dated Sep. 8, 2008.
WO Office Action mailed Sep. 8, 2008.

* cited by examiner

*Primary Examiner*—Vijay Shankar
(74) *Attorney, Agent, or Firm*—Thomas, Kayden, Horstemeyer & Risley

(57) ABSTRACT

A pen-type computer includes a pen barrel, a sensor, a primary processor, and a storage device. The pen barrel has a writing tip. The sensor is disposed in the pen barrel, sensing movement of the writing tip and generating a tracking signal corresponding to the movement of the writing tip. The primary processor is disposed in the pen barrel, encoding the tracking signal into data and storing the data in the storage device.

30 Claims, 7 Drawing Sheets

PEN-TYPE COMPUTER

BACKGROUND OF THE INVENTION

1. Field of the Invention

The invention relates to a pen-type computer, and in particular to a pen-type computer which is capable of writing, sound-recording, and sound-playing operations, and includes a detachable earphone.

2. Description of the Related Art

For different activities people use different equipment and tools. In a lecture, for example, a person may need to take notes, or even use an audio recorder to avoid missing any lecture content. In a video conference, for another example, the participants wear headphones to communicate with each other. For user convenience, therefore, a versatile tool suitable for different activities is desirable.

BRIEF SUMMARY OF THE INVENTION

The invention provides a pen-type computer which is capable of writing, sound-recording, and sound-playing operations, and includes a detachable earphone.

The pen-type computer includes a pen barrel, a sensor, a primary processor, and a storage device. The pen barrel has a writing tip. The sensor is disposed in the pen barrel, sensing movement of the writing tip and generating a tracking signal corresponding to the movement of the writing tip. The primary processor is disposed in the pen barrel, encoding the tracking signal into data and storing the data in the storage device.

The pen-type computer may further include a microphone, an analog-to-digital converter, and a digital signal processor. The microphone receives sound and generates an analog signal. The analog-to-digital converter converts the analog signal into a first digital signal. The digital signal processor processes the first digital signal to generate a second digital signal. The primary processor processes the second digital signal to obtain data and stores the data in the storage device.

The pen-type computer may further include a digital-to-analog converter and a sound-generating device, wherein the primary processor decompresses the data in the storage device and obtains a digital signal, the digital-to-analog converter converts the digital signal into an analog signal, and the sound-generating device turns the analog signal into sound.

The pen-type computer may further include a transceiver sending out the data in the storage device to an external device and receiving data from the external device.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
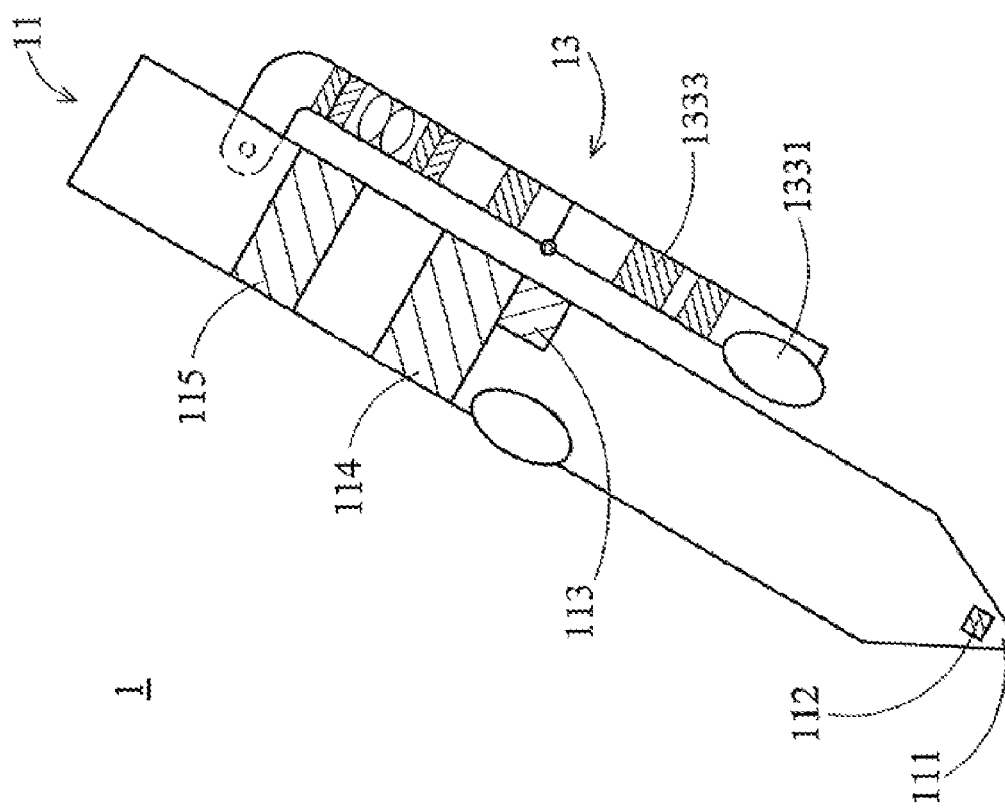
FIG. 1 is a schematic diagram of a pen-type computer in accordance with an embodiment of the invention.

Referring to FIG. 1, a pen-type computer 1 in accordance with an embodiment of the invention includes a pen barrel 11 and a clip 13 hinged to the pen barrel 11. A sensor 112, a primary processor 113, a storage device 114, and a battery 115 are disposed in the pen barrel 11, wherein the battery 115 supplies power to all of the components 112, 113 and 114 in the pen barrel 11.

Figure 2:
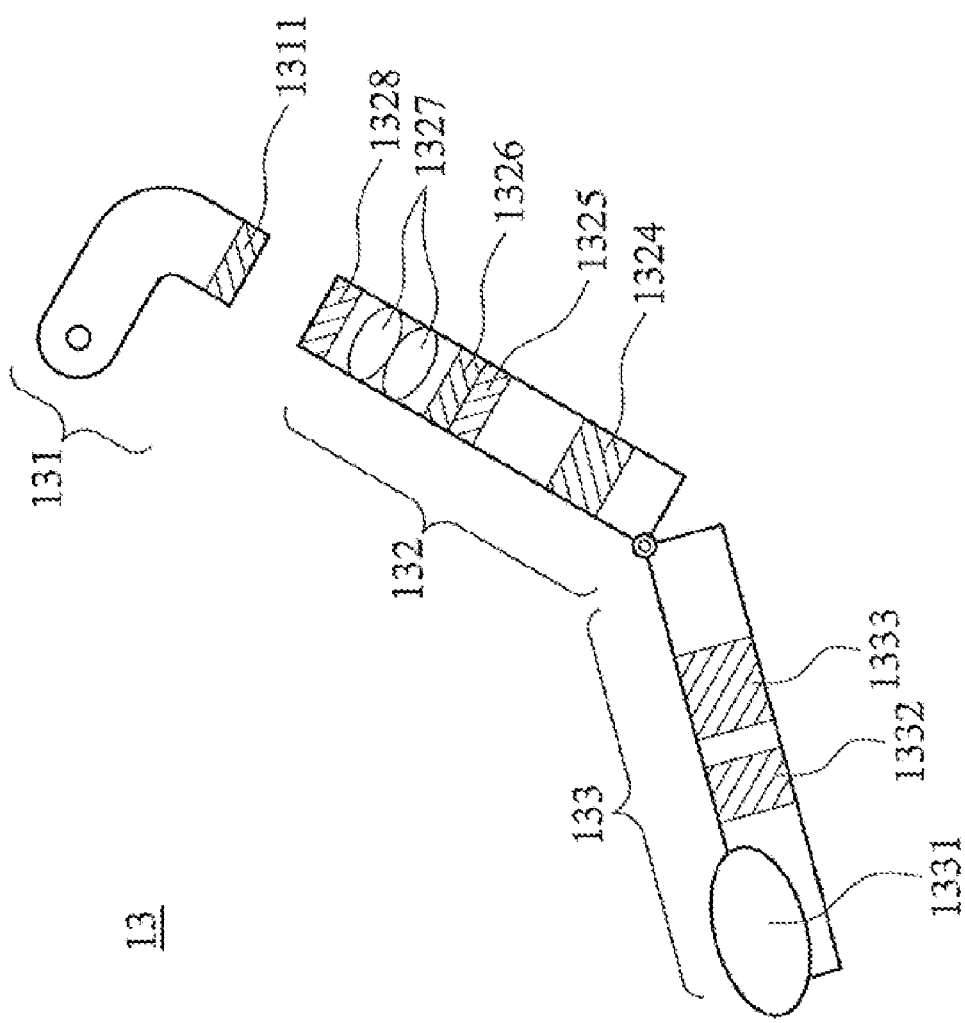
FIG. 2 is a schematic diagram of a clip of a pen-type computer of FIG. 1.

Referring to FIG. 2, the clip 13 includes a first part 131, an elongated second part 132, and an elongated third part 133. The first part 131 is hinged to the pen barrel 11. The first part 131 and the second part 132 are detachably connected via connectors (e.g. universal serial bus, USB) 1311 and 1328. The third part 133 is hinged to the second part 132. A battery 1324, a digital signal processor (DSP) 1325, an analog-to-digital converter 1326, and array microphones 1327 are disposed in the second part 132, while a sound-generating device 1331, a digital-to-analog converter 1332, and a transceiver 1333 are disposed in the third part 133. The battery 1324 in the second part 132 supplies power to all of the components 1325, 1326, 1327, 1331, 1332 and 1333 in the clip 13. It is noted that the array microphones 1327 are longitudinally arranged along the clip 13.

Figure 3:
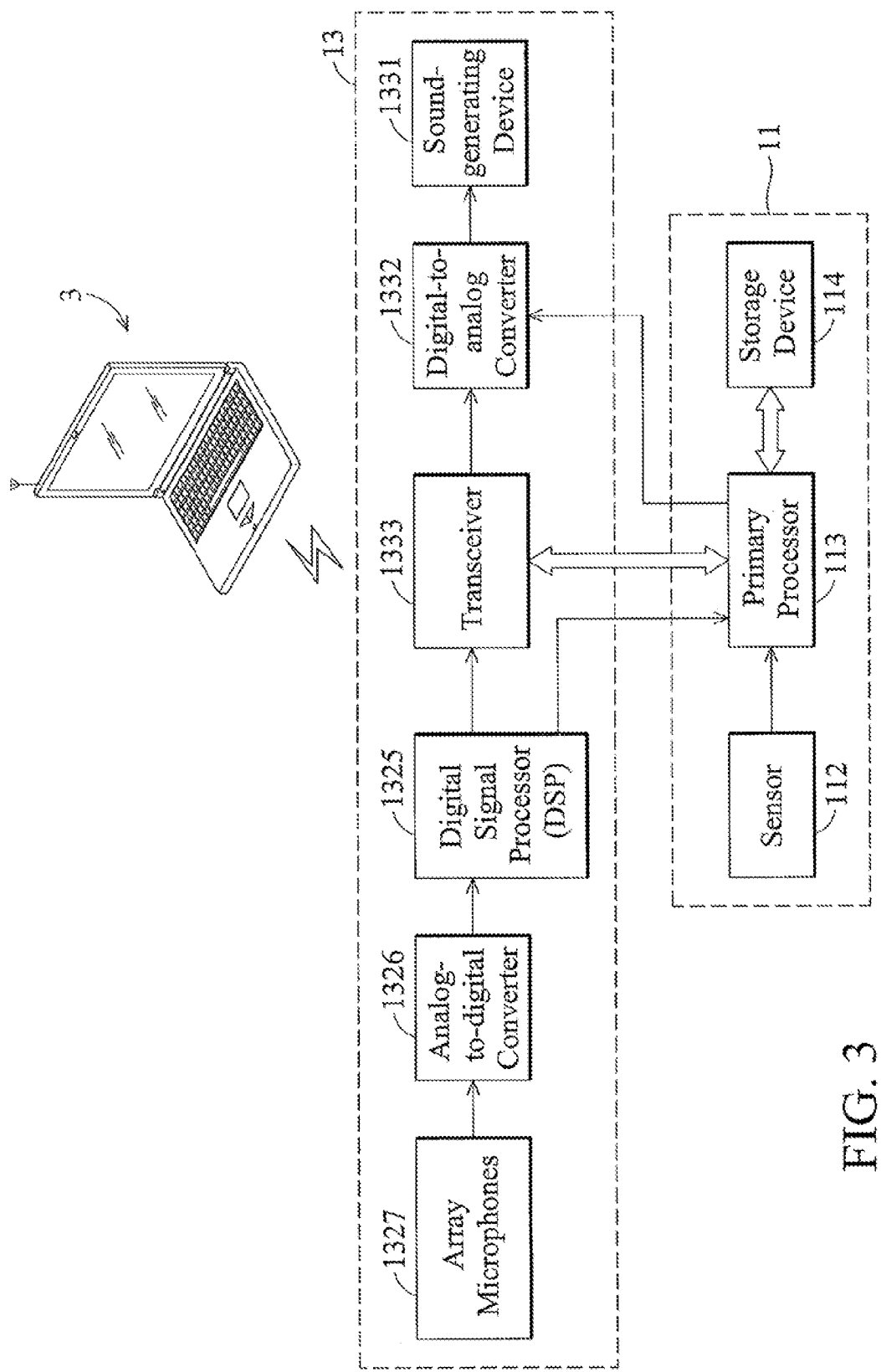
FIG. 3 is a block diagram of the pen-type computer of FIG. 1.

Referring to FIGS. 1 and 3, in a writing operation, a user grips the pen barrel 11 of the pen-type computer 1 and writes words on a surface (e.g. desk surface). The sensor 112 senses the movement of the writing tip 111 of the pen barrel 11 and generates a tracking signal corresponding to the movement of the writing tip 111. The primary processor 113 encodes the tracking signal into data (e.g. text-type data) and stores the data in the storage device 114.

Figure 4:
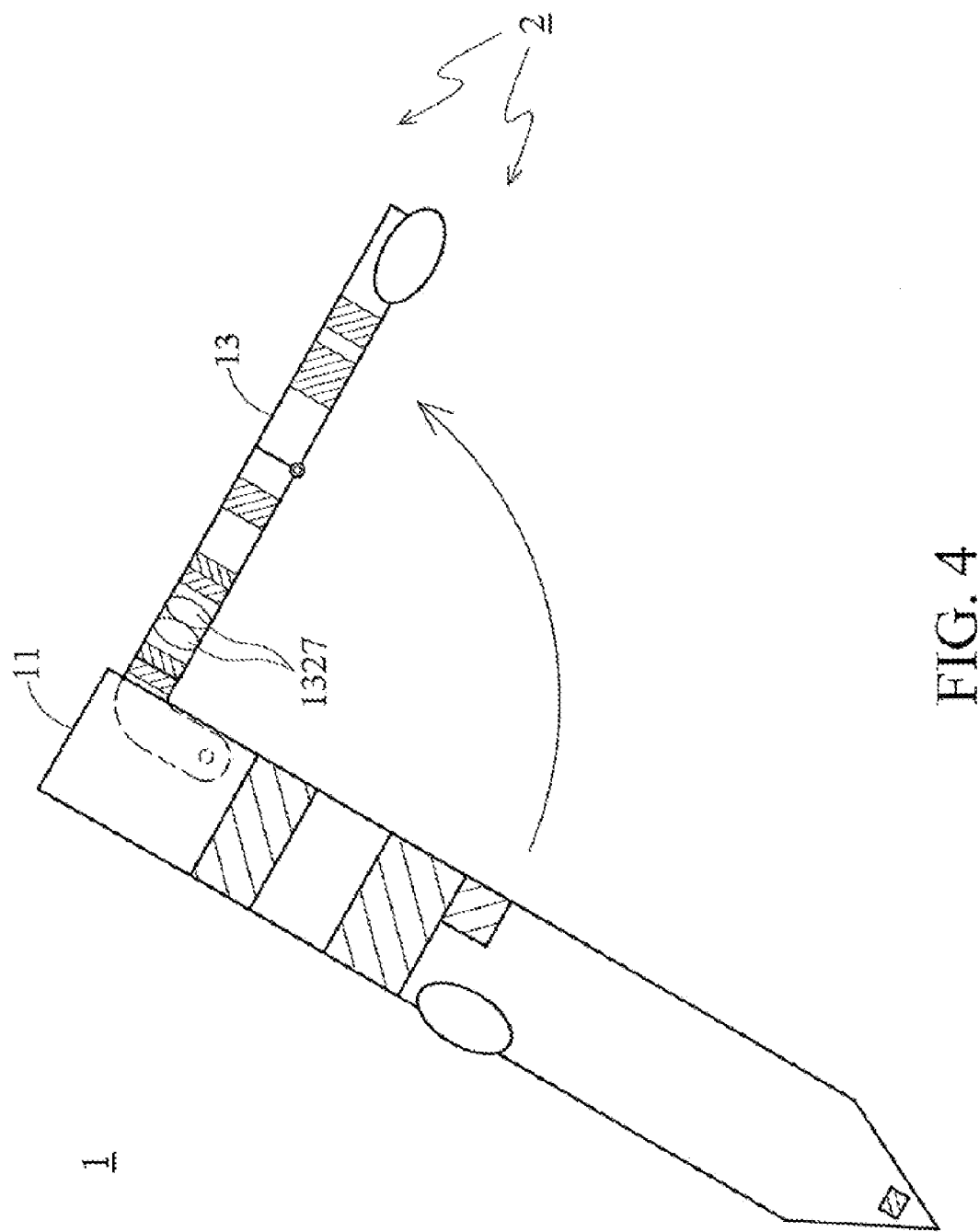
FIG. 4 depicts a sound-recording operation of the pen-type computer of FIG. 1.

Referring to FIGS. 3 and 4, in a sound-recording operation, the user rotates the clip 13 and directs the array microphones 1327 to a target sound source 2. The array microphones 1327 receive sound from the target sound source 2 and generate an analog electrical signal. The analog-to-digital converter 1326 converts the analog electrical signal into a first digital signal. The digital signal processor (DSP) 1325 processes the first digital signal for the purposes including beamforming, echo cancellation, noise suppression etc., and obtains a second digital signal. The primary processor 113 processes the second digital signal for the purposes including voice recognition and data compression to obtain data (e.g. audio data), and stores the data in the storage device 114.

Referring to FIGS. 1 and 3, in a sound-playing operation, the primary processor 113 decompresses the data in the storage device 114 to obtain a digital signal. The digital-to-analog converter 1332 converts the digital signal into an analog signal. Then, the sound-generating device 1331 serves as a loudspeaker, turning the analog signal into sound.

The data in the storage device 114 can be sent to an external device 3 (e.g. portable computer, personal digital assistant, cellular phone, etc.) via the transceiver 1333. Furthermore, data in the external device 3 can be sent to the pen-type computer 1 via the transceiver 1333 and stored in the storage device 114.

Figure 5:
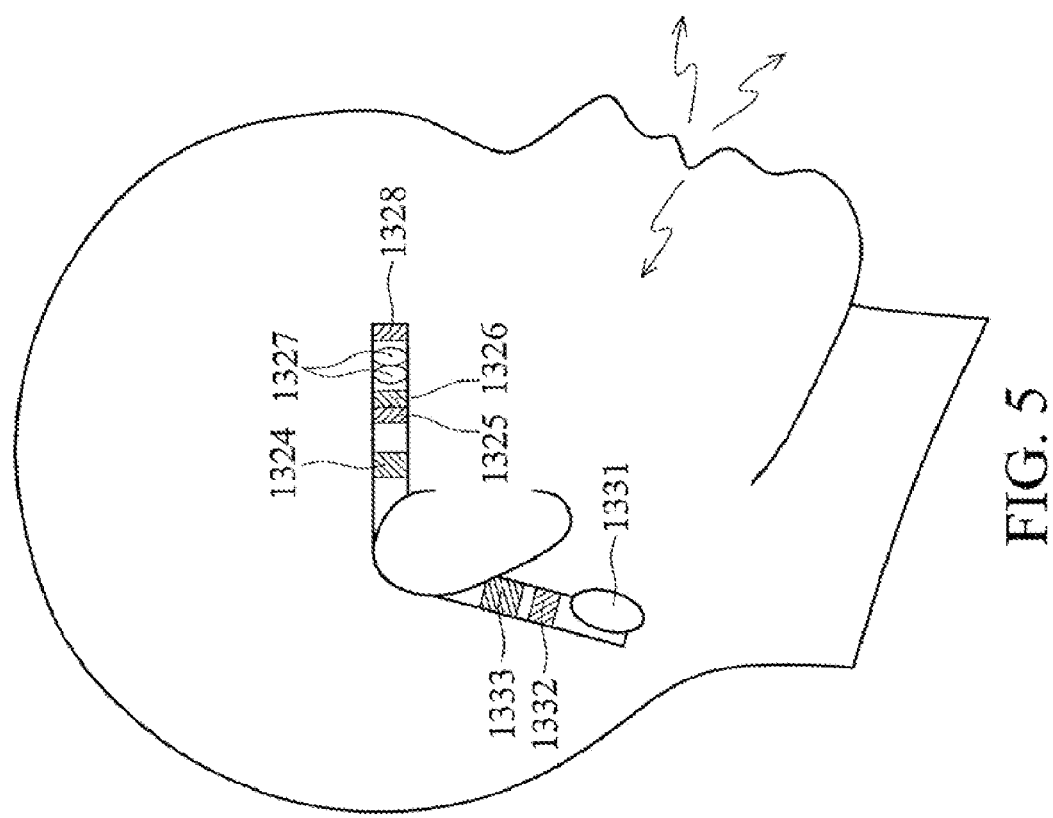
FIG. 5 depicts an earphone detached from the pen-type computer of FIG. 1 and worn over user's ear.
Figure 6:
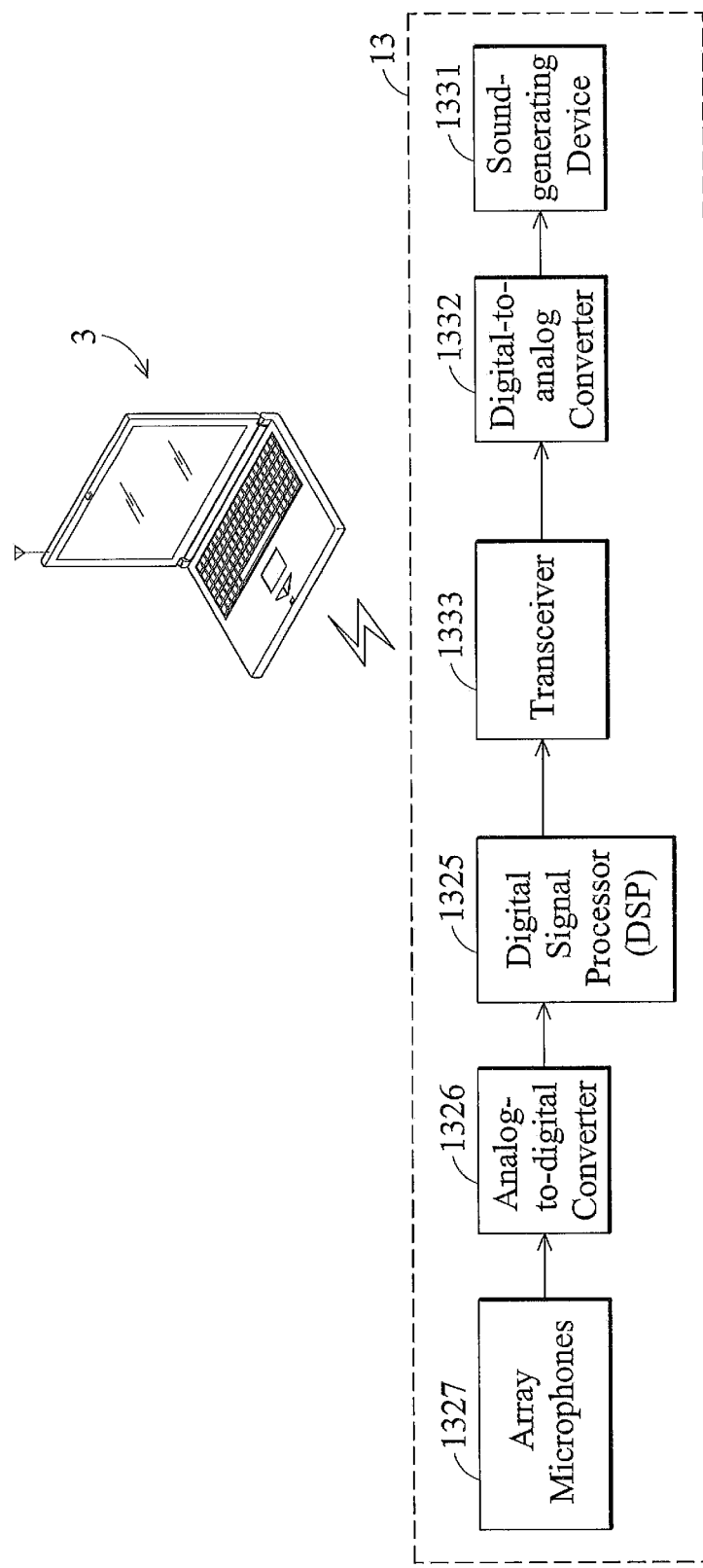
FIG. 6 is a block diagram of the earphone in FIG. 5.

Referring to FIGS. 2 and 5, the second and third parts 132 and 133 can be detached from the first part 131 which is hinged to the pen barrel 11, and then worn over a user's ear to serve as an earphone. Also referring to FIG. 6, during a use of the earphone, the transceiver 1333 receives a digital sound signal from the external device 3. The digital-to-analog converter 1332 converts the digital sound signal into an analog signal. Then, the sound-generating device 1331 turns the analog signal into sound. When the user speaks, the array microphones 1327 receive the voice and generate an analog electrical signal. The analog-to-digital converter 1326 converts the analog electrical signal into a first digital signal. The digital signal processor (DSP) 1325 processes the first digital signal for the purposes including beamforming, echo cancellation, noise suppression etc., and obtains a second digital signal. Then, the transceiver 1333 sends out the second digital signal to the external device 3.

In an exemplary embodiment of the invention, the earphone is a wireless-bluetooth earphone and the transceiver 1333 is a bluetooth transceiver.

Figure 7:
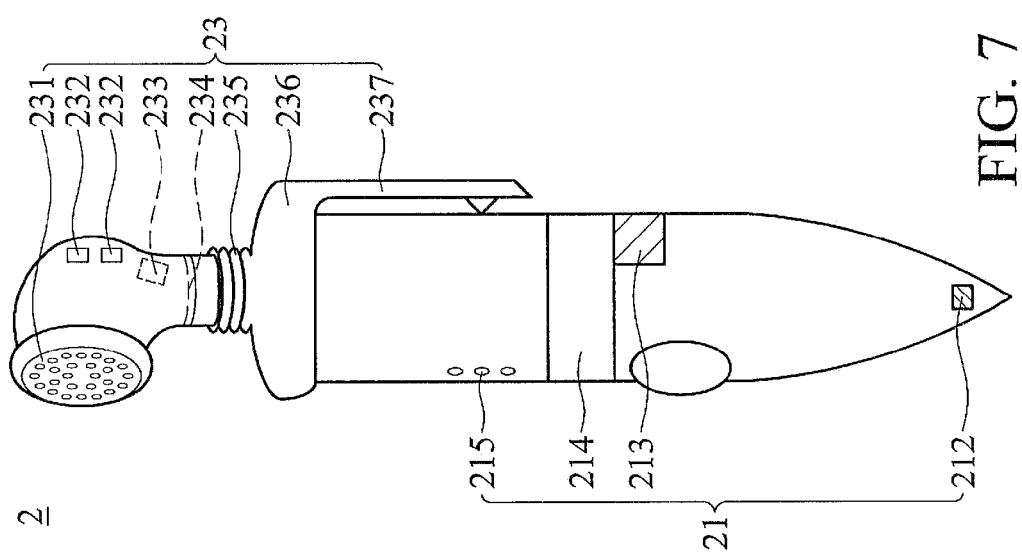
FIG. 7 is a schematic diagram of a pen-type computer in accordance with another embodiment of the invention.

Referring to FIG. 7, a pen-type computer 2 in accordance with another embodiment of the invention includes a pen barrel 21 and a pen cap 23 attached to the pen barrel 21.

The pen barrel 21, similar to that of the previous embodiment, has a sensor 212 sensing the movement of the writing tip, a primary processor 213 encoding the tracking signal into data, and a storage device 214 storing the data. In this embodiment, the pen barrel 21 further includes a unidirectional sound-generating device 215 (e.g. array speakers). In operation, the user directs the unidirectional sound-generating device 215 to a person. Then, only the person can hear the sound from the sound-generating device 215.

The pen cap 23 has a cap body 236, a clip 237 extending from the cap body 236, a flexible portion 235 extending from the cap body 236, and an earphone 231 connected to the flexible portion 235 via connectors 234 (e.g. universal serial bus, USB).

The earphone 231 has array microphones 232 and a transceiver 233 inside. In a sound-recording operation, the user directs the array microphones 232 to a target sound source and records the sound in the storage device 214 of the pen barrel 21.

Figure 8:
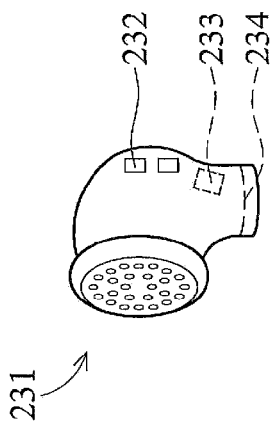
FIG. 8 depicts an earphone detached from the pen-type computer of FIG. 7.

Referring to FIG. 8, the earphone 231 can be detached from the flexible portion 235 of the pen cap 23 and put in a user's ear. Then, the earphone 231 receives a sound signal from an external device via the transceiver 233.

In an exemplary embodiment of the invention, the earphone 231 is a wireless-bluetooth earphone and the transceiver 233 is a bluetooth transceiver.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pen-type computer, comprising:
   a pen barrel comprising a writing tip;
   a sensor disposed in the pen barrel, sensing movement of the writing tip and generating a tracking signal corresponding to the movement of the writing tip;
   a primary processor disposed in the pen barrel, encoding the tracking signal into first data;
   a storage device storing the first data;
   a clip hinged to the pen barrel;
   a microphone which receives sound and generates an analog signal;
   an analog-to-digital converter which converts the analog signal into a first digital signal; and
   a digital signal processor which processes the first digital signal to generate a second digital signal, wherein the primary processor processes the second digital signal to obtain second data and stores the second data in the storage device.

2. The pen-type computer as claimed in claim 1, wherein processing of the first digital signal by the digital signal processor includes beamforming.

3. The pen-type computer as claimed in claim 1, wherein processing of the first digital signal by the digital signal processor includes echo cancellation.

4. The pen-type computer as claimed in claim 1, wherein processing of the first digital signal by the digital signal processor includes noise supression.

5. The pen-type computer as claimed in claim 1, wherein processing of the second digital signal by the primary processor includes voice recognition.

6. The pen-type computer as claimed in claim 5, wherein processing of the second digital signal by the primary processor further includes data compression.

7. The pen-type computer as claimed in claim 1, further comprising two microphones which receive sound and generate an analog signal,
   an analog-to-digital converter which converts the analog signal into a first digital signal, and
   a digital signal processor which processes the first digital signal to generate a second digital signal, wherein the two microphones are disposed at the clip, and the primary processor processes the second digital signal to obtain second data and stores the second data in the storage device.

8. The pen-type computer as claimed in claim 7, wherein the two microphones are array microphones.

9. The pen-type computer as claimed in claim 8, wherein the two microphones are longitudinally arranged along the clip.

10. The pen-type computer as claimed in claim 1, wherein the clip comprises a first part hinged to the pen barrel, and a second part detachably connected to the first part, and the microphone is disposed at the second part.

11. The pen-type computer as claimed in claim 10, further comprising connectors connecting the first part and the second part.

12. The pen-type computer as claimed in claim 11, wherein the connectors are universal serial bus connectors.

13. The pen-type computer as claimed in claim 1, further comprising a digital-to-analog converter and a sound-generating device, wherein the primary processor decompresses the first data in the storage device and obtains a digital signal, the digital-to-analog converter converts the digital signal into an analog signal, and the sound-generating device turns the analog signal into sound.

14. The pen-type computer as claimed in claim 1, further comprising a transceiver which sends out the first data in the storage device to an external device and receives second data from the external device.

15. The pen-type computer as claimed in claim 14, wherein the transceiver is a wireless transceiver.

16. A pen-type audio apparatus for voice capture and outputting voice, comprising:
   a pen barrel; and
   an earphone with a connecting means, a speaker and a array microphone, the speaker and the array microphone connected to the pen barrel, wherein the earphone include an earplug structure, wherein the earphone comprises a first part, a second part hinged to the first part, two microphones disposed at the first part, and a sound-generating device disposed at the second part.

17. The pen-type audio apparatus as claimed in claim 16, wherein the earphone is a wireless earphone.

18. The pen-type audio apparatus as claimed in claim 16, wherein the earphone is a wireless-bluetooth earphone.

19. The pen-type audio apparatus as claimed in claim 16, wherein the earphone comprises a first part, a second part hinged to the first part, a microphone disposed at the first part, and a sound-generating device disposed at the second part.

20. The pen-type audio apparatus as claimed in claim 16, wherein the first part is elongated and the two microphones are array microphones longitudinally arranged along the first part.

21. The pen-type audio apparatus as claimed in claim 20, further comprising a transceiver which receives a sound signal from an external device for the sound-generating device to play, and sends out another sound signal to the external device, received from the two microphones.

22. The pen-type audio apparatus as claimed in claim 16, further comprising a cap body connected between the pen barrel and the earphone.

23. The pen-type audio apparatus as claimed in claim 22, further comprising connectors connecting the cap body and the earphone.

24. The pen-type audio apparatus as claimed in claim 23, wherein the connectors are universal serial bus connectors.

25. The pen-type audio apparatus as claimed in claim 22, further comprising a clip extending from the cap body.

26. The pen-type audio apparatus as claimed in claim 22, further comprising a flexible portion connecting the earphone and the cap body.

27. The pen-type audio apparatus as claimed in claim 16, further comprising a microphone disposed in the earphone.

28. The pen-type audio apparatus as claimed in claim 16, further comprising array microphones disposed in the earphone.

29. The pen-type audio apparatus as claimed in claim 16, further comprising a sound-generating device disposed in the pen barrel.

30. The pen-type audio apparatus as claimed in claim 29, wherein the sound-generating device includes array speakers.

\* \* \* \* \*